(No Model.)  2 Sheets—Sheet 1.

J. T. McCONNELL.
Telephone.

No. 239,818. Patented April 5, 1881.

Witnesses  
C. L. Parker  
R. H. Whaley

Inventor Joseph T. McConnell  
By Attorney George H. Christy (No Model.) 2 Sheets—Sheet 2.

J. T. McCONNELL.
Telephone.

No. 239,818. Patented April 5, 1881.

Witnesses
D. F. Patterson
O. L. Parker

Inventor Joseph T. McConnell
By Attorney George H. Christy

UNITED STATES PATENT OFFICE.

JOSEPH T. McCONNELL, OF BRADDOCK, ASSIGNOR TO HIMSELF AND EDWARD A. KITZMILLER, OF HAWKINS STATION, PENNSYLVANIA.

TELEPHONE.

SPECIFICATION forming part of Letters Patent No. 239,818, dated April 5, 1881.

Application filed November 15, 1880. (No model.)

*To all whom it may concern:*

Be it known that I, JOSEPH T. MCCONNELL, of Braddock, county of Allegheny, State of Pennsylvania, have invented or discovered a new and useful Improvement in Attachments for Receiving - Telephones for Making and Breaking Local - Battery Circuits; and I do hereby declare the following to be a full, clear, concise, and exact description thereof, reference being had to the accompanying drawings, making a part of this specification, in which—like letters indicating like parts—

Figure 1:
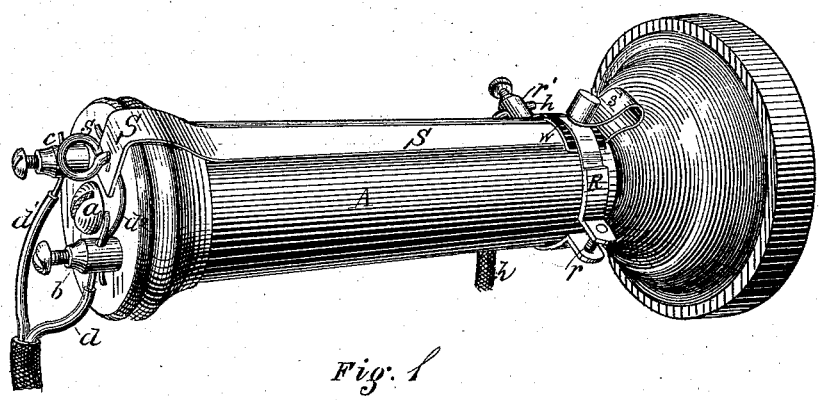
Figure 2:
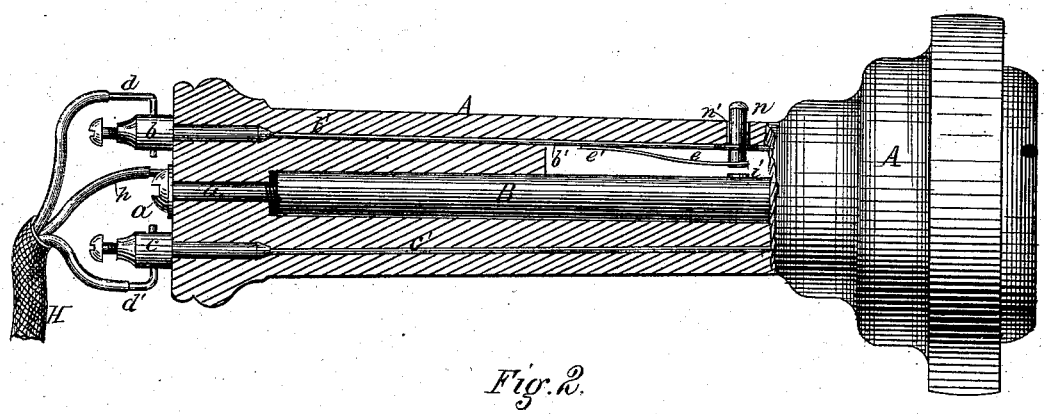
Figure 3:
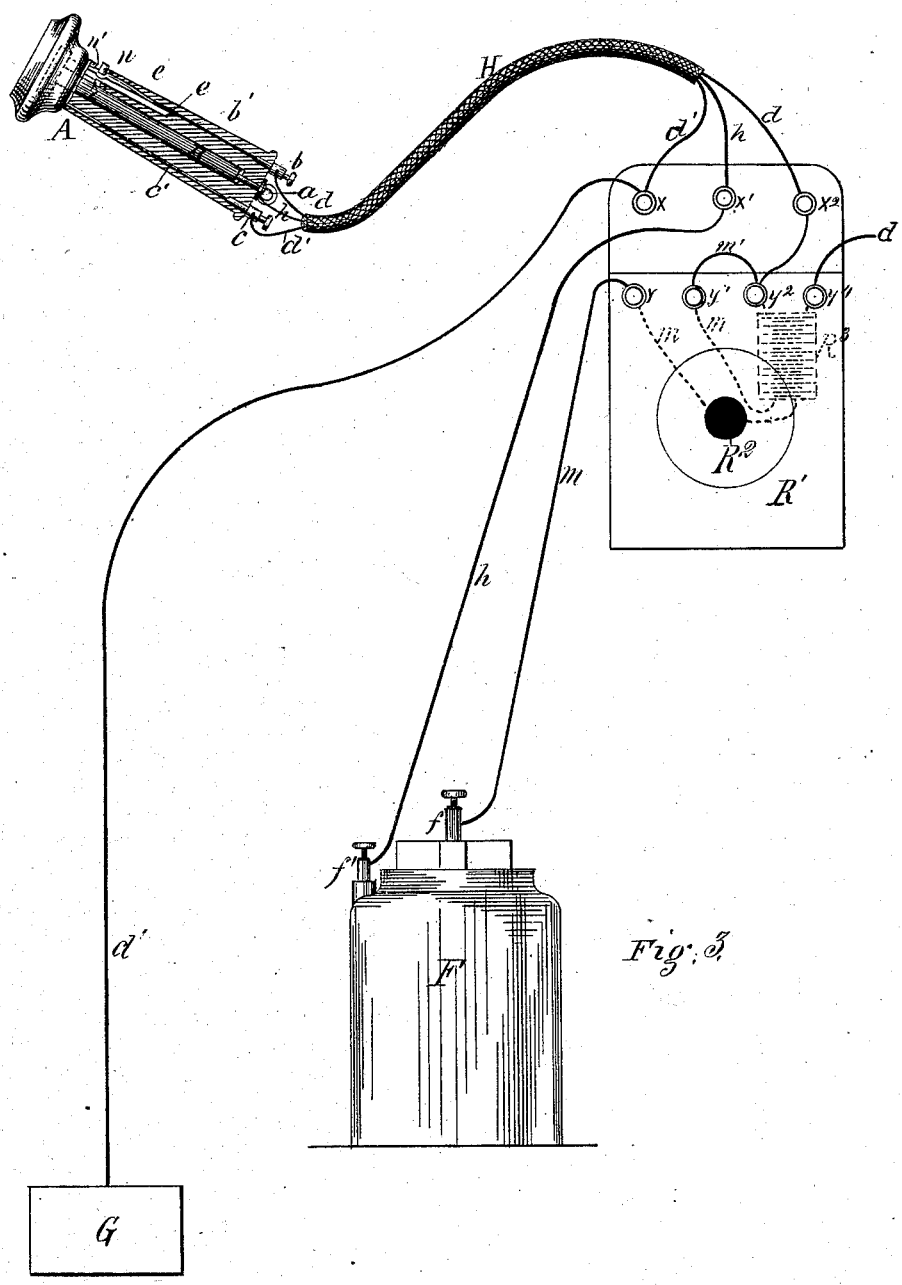

Figure 1 is a perspective view of a receiving-telephone, showing my improved circuit-closing attachment applied thereto; and Fig. 2 shows, in sectional elevation, a receiving-telephone embodying in its construction the principles and features of my invention. Fig. 3 illustrates the circuit-connections made from the receiving-telephone through the transmitter to local battery, and also to main line, the same forming an element of my invention.

As electric-telephone systems are ordinarily arranged and operated, a local battery is employed at each subscriber's station, such battery being used for transmitting calls and conversation from that station to another. In calling, this battery is employed for a moment only, and its circuit extends over the main line to the called station, cutting out or shunting the induction-coil of the transmitter, and does not, of necessity, pass through the transmitter at all; but for transmitting conversation this local-battery circuit is maintained while the transmitter is in use, and its circuit is through the contact-point of the speaking-telephone and through the primary of the induction-coil, (the main line passing through the secondary,) and in this case the local circuit is strictly local, and does not pass to another station.

It is desirable, both as a matter of economy and as securing the best working of the apparatus, that the local battery should be in action through this latter or local circuit during such time only as may be required for speaking by the subscriber at that station, and that while such subscriber is listening, or his transmitter is not in use, his battery may rest or its circuit be open.

In the Bell telephone, as commonly used, the local - battery circuit is closed through the transmitter automatically, and remains closed during the entire time that circuit-connection is closed through the receiving-telephone. This results in a material loss of battery-power; and when such connections are long continued, in listening or waiting, a battery of sufficient power for occasional use, such as is employed for ordinary business purposes, becomes too weak in its action to give proper or satisfactory results.

In the Edison telephone a circuit-closing spring-button is attached to the side of the box or case of the speaking-telephone or transmitter, and while speaking this button is pressed by one hand to close the battery-circuit, while the receiving-telephone is held to the ear with the other hand. This arrangement enables the subscriber to discontinue the action of his battery while waiting or listening; but it is attended with inconvenience, because both hands are necessarily employed, and this inconvenience becomes a serious and troublesome matter when attempting to read from a book, manuscript, or memorandum; also, if conversation be long continued, the operation of pressing the button becomes tiresome and even painful, owing to the unnatural position of arms and body required.

My invention is designed to place the local-battery circuit of a subscriber under his personal control by means which enable him to secure all the advantages of such control without or free from the disadvantages which have attended constructions heretofore in use.

In general terms, my invention consists in passing the local-battery circuit through the induction - coil of the transmitter, and to or through the receiving-telephone to a make-and-break mechanism in or on such telephone, which is arranged in convenient position to be moved or operated by the hand which holds the telephone.

I have shown in Figs. 2 and 3 of the drawings one form in which my invention may be applied to a receiving-telephone in the course of its original construction. In these figures, A represents the case of a receiving-telephone. The form here shown is one in common use;

but I do not confine my invention to this or any particular form. This case contains the usual bar-magnet, B, which extends backward toward and is secured to the rear end by binding-screw $a$. Two binding-posts, $b$ and $c$, for line-wire attachments are also secured in this end of the case, which lead, by wires $b'$ $c'$, (the case being a non-conductor,) to the telephone proper in the opposite end of the case, and form a part of the main-line or receiving circuit of the telephone. From one of such posts, as $c$, the ground-wire $d'$ of main line passes to a convenient post, $x$, and thence to ground G. From the other post, $b$, the main-line wire $d$ passes, by posts $x^2$ and $y^2$, through the outer or secondary coil of an ordinary induction-coil, $R^3$, in the transmitter-box $R'$, and thence, by post $y^3$, to the telephone at a distant station and to ground, thus completing the main-line circuit. From a suitable local battery, F, a wire, $m$, leads from one pole, $f$, by post $y$, through the contact-points of the transmitter or speaking-telephone $R^2$, and through the inner or primary coil of $R^3$ to post $y'$.

In passing the local-battery circuit into or through receiver A one of the line-wires, as wire $d$, may be used as a return-wire, connection being made therewith at any convenient point in its length, as by loop $m'$ in the transmitter-box. Connection with the other pole, $f'$, of the local battery is made by a third wire or flexible conductor, $h$, which, passing through post $x'$, is secured to or bound under the screw $a$, and thus makes connection with magnet B, which serves as a part of the battery-circuit as well as a magnet. This wire $h$ may, with line-wires $d$ $d'$, be carried into and form part of a three-ply wire, H, or it may be carried separately to the battery. Circuit is made and broken between magnet B and wire $b'$ by means of a spring, $e$, which is secured in any convenient way to the inner wall of the case, and makes electrical or circuit connection with the wire, as at $e'$. The forward or free end of this spring rests over a contact-piece, $i$, soldered or otherwise secured to the magnet, and by pressing the spring against such piece circuit will be made from pole to pole of the local battery. Pressure is given to the spring by means of a stud, $n$, which extends outward from the free end of the spring through a suitable opening, $n'$, in the case. The position of the spring and stud is, by preference, such that the forefinger of the hand may easily rest on the stud as the hand grasps the telephone in the usual way. Then (the main-line circuit remaining closed through receiver A) the battery-circuit may be made or broken without any inconvenience or trouble, and without requiring the use of an additional hand, as heretofore. Also, since the movement which opens and closes this circuit is given by the hand which holds the instrument to the ear, it will be done almost involuntarily, without distraction or special effort, and the subscriber will be far more likely to make use of this means to economize the strength of his battery than he would do if the entire service of a hand were devoted to such work, as heretofore. Such economy is advantageous both to the subscriber in insuring prompt and energetic action of his battery when needed, and to the company which furnishes the apparatus and keeps it in good order. It is therefore of material importance that the subscriber be furnished with a circuit-closing device for his battery which can be operated by him with the greatest convenience, since the probability is thereby increased that he will use it as designed.

In Fig. 1 is illustrated a mode of applying my invention to receiving-telephones already in use.

Along the stem or handle of the telephone A is secured a metallic strip, S, by a loop-screw, $s$, at the rear end, and by a clamp-band, R, at the front end. The screw $s$ is ordinarily attached to this form of instrument, for hanging it on the automatic switch when not in use. The meeting ends of band R are united by a screw, $r$, by means of which the band may be clamped in place. On the side of this band is a binding-post, $r'$, adapted to hold one wire or conductor, $h$, of the battery-circuit, and afford electrical communication with the band. One of the telephone receiving-wires, as wire $d$, may be employed, as before described, as a return-wire for the battery-circuit, and a short wire, $d^2$, from post $b$ to strip S will bring this strip into the circuit. An insulating-plate, $w$, is inserted between the strip and band to prevent contact at that point, and the forward end of the strip is bent upward and over the band, thereby forming a bow-spring, $s'$. By pressing the free end of this spring down upon the band contact is made and the battery-circuit closed. By releasing the spring it will rise off the band and the circuit will be opened. For convenience in operating the spring, it may be arranged, like the spring $e$, Fig. 2, in such position that the forefinger of the hand, holding the telephone in the ordinary way, may press the spring and make and break contact or circuit, as desired. I do not wish to limit my invention, however, to this particular position of the spring in or on the telephone, as it, or an equivalent make-and-break mechanism, may be located at other points and still secure the advantages sought, by enabling the operator to make or break his battery-circuit by movement or pressure of the hand holding the receiving-telephone in position for hearing.

The strip S may be covered with any suitable non-conductor, to prevent the hand from taking a shock.

Also, insulation may be made between screw $s$ and strip S, to prevent interference of circuits when the telephone is hanging on the automatic switch.

If preferred, an insulated wire may extend from post $b$ to the spring $s'$, instead of strip S, and such wire may lie against or away from the stem of the telephone.

Also, instead of using one of the wires, $d$ or $d'$, as a battery-circuit wire, an independent wire may be used; but, for convenience, I prefer to use one of these, $d$ or $d'$, as it can be done without interfering with their other functions.

I am aware that it is not new with me to pass a local-battery circuit through a make-and-break mechanism on the receiver, so connected with the main line that the local battery can at will be sent over the main line for calling a distant station. But such an arrangement or combination does not embody my present invention, and cannot be made to accomplish the purposes I have herein described.

In my invention the local battery is not sent over the main line at all, properly speaking, and its local circuit is opened and closed by the make-and-break mechanism simply as required by the use of the speaking-telephone, and not for calling over main line.

I claim herein as my invention—

A receiving-telephone having three or more posts or points of attachment for electric-circuit wires, two of which are connected by a make-and-break mechanism on such telephone, in combination with a separate battery-transmitter, a main-line circuit passing through the receiving-telephone proper by the unconnected posts, and through the secondary coil of the transmitter, a local battery and a local circuit from such battery, through the speaking-telephone and primary coil of the transmitter, to the two posts on the receiver, which are connected by the make-and-break mechanism, substantially as and for the purposes set forth.

In testimony whereof I have hereunto set my hand.

JOSEPH T. McCONNELL.

Witnesses:
C. L. PARKER,
R. H. WHITTLESEY.